United States Patent [19]

Devos

[11]  4,238,936
[45]  Dec. 16, 1980

[54] UNIVERSAL HOMOKINETIC JOINT

[76] Inventor: Gaston Devos, "La Réale", 06230 Villefranche-sur-Mer, France

[21] Appl. No.: 18,559

[22] Filed: Mar. 8, 1979

[30] Foreign Application Priority Data

Apr. 28, 1978 [FR] France ............................... 78 12668

[51] Int. Cl.$^3$ ............................................. F16D 3/30
[52] U.S. Cl. ............................................. 64/21; 64/6
[58] Field of Search ........................... 64/21, 8, 6

[56] References Cited

U.S. PATENT DOCUMENTS

| | | | |
|---|---|---|---|
| 2,737,790 | 3/1956 | Ballomo | 64/21 |
| 3,002,364 | 10/1961 | Ballomo | 64/21 |
| 3,296,834 | 1/1967 | Grauel | 64/21 |
| 3,447,341 | 6/1969 | Miller, Jr. | 64/21 |
| 3,475,924 | 11/1969 | Aucktor | 64/21 |
| 3,965,701 | 6/1976 | Orain | 64/21 |
| 4,078,400 | 3/1978 | Krude | 64/21 |

FOREIGN PATENT DOCUMENTS

| | | | |
|---|---|---|---|
| 1113353 | 3/1953 | France | 64/21 |
| 1177760 | 4/1956 | France | 64/21 |
| 1357053 | 2/1964 | France | 64/21 |
| 1404096 | 5/1965 | France | 64/21 |
| 1427218 | 12/1965 | France | 64/21 |
| 1468337 | 12/1966 | France | 64/21 |
| 1487490 | 5/1967 | France | 64/21 |
| 2078478 | 11/1971 | France | 64/21 |
| 2237523 | 7/1973 | France | 64/21 |
| 1018029 | 1/1966 | United Kingdom | 64/21 |
| 1135321 | 12/1968 | United Kingdom | 64/21 |
| 1282909 | 7/1972 | United Kingdom | 64/21 |
| 1305225 | 1/1973 | United Kingdom | 64/21 |
| 1523799 | 9/1978 | United Kingdom | 64/21 |
| 1478514 | 7/1977 | United Kingdom | 64/21 |

*Primary Examiner*—Henry K. Artis
*Attorney, Agent, or Firm*—Karl W. Flocks

[57] ABSTRACT

Homokinetic joint of the type in which the torque is transmitted between two ends by balls engaged in races or tracks made in said ends.

Each track is constituted by two semi-cylindrical grooves, the sectional diameter of which being oriented relative to a radial axis passing through the geometrical center of the joint and perpendicular to the longitudinal axis of said two ends. The balls are thus made to roll and to be guided between two poles located on the radial axis and two other poles located on an axis perpendicular to said radial axis. Said arrangement excludes the use of any intermediate means for maintaining the balls on the bisecting plane of the joint.

The invention is particularly adapted to realize the two-joints transmission assembly for a vehicle.

5 Claims, 33 Drawing Figures

FIG.32 FIG.33

UNIVERSAL HOMOKINETIC JOINT

BRIEF SUMMARY OF THE INVENTION

The present invention relates to a homokinetic joint of the type in which the torque is transmitted between two ends by balls engaged in races or tracks made in said ends.

The invention relates to a homokinetic joint wherein each track is constituted by two semi-cylindrical grooves, the sectional diameter of each of said grooves being diagonally oriented relative to a radial axis passing through the geometrical centre of the joint and perpendicular to the longitudinal axis of the two ends of the joint, as a result each of the balls is made to roll and is guided between two poles located on said radial axis and two other poles located on an axis perpendicular to the radial axis, said arrangement with four poles excluding the use of intermediate means for constantly and imperatively maintaining the balls on the bisecting plane of the respective longitudinal axes of the two ends and causing the balls to transmit the torque in the two rotational directions of the joint, unitary pressures on the balls being considerably reduced in one of these two rotation directions.

Due to the new technique used there are numerous constructural embodiments of the joint according to the invention. They can receive a variable quantity of balls and their two ends may either move longitudinally with respect to one another, their axial centering being ensured by the balls, or conversely they can be longitudinally centred relative to one another by concave surfaces acting in convex surfaces provided on the ends.

In addition to the fundamental advantage of obviating the use of intermediate means for imperatively maintaining the balls on the bisecting plane of the joint according to the invention also makes it possible to reduce the angle given to the grooves forming a housing for the ball, their addition not necessarily being greater than that of the maximum angular work of the joint due to the inversion of the angle occurring during said angular work.

The angle of the grooves may even be zero in joints operating with a constant angular velocity, the latter then being substituted for the zero angle of the grooves.

The transverse space separating two grooves permit their displacement in the angular work of the joint and is either parallel to the axis thereof passing through the geometrical centre of the joint or, as a variant, is positioned diagonally relative to said axis.

In sliding joints the balls can be introduced with the ends facing. In longitudinally centred joints a first ball is introduced into its grooves up to the bisecting plane thereof and with the grooves at a zero angle relative to one another each of the other balls is then introduced in the same way.

BRIEF DESCRIPTION OF THE DRAWINGS

Other characteristics, advantages and features of the present invention can be gathered from the following description of non-limitative embodiments and with reference to the attached drawings, wherein show.

THE DETAILED DESCRIPTION OF THE PREFERRED EMBODIMENTS

According to a first possible embodiment of a joint with two balls and with integrated sliding in accordance with the present invention, shown in exemplified manner in FIGS. 1 to 8, said joint essentially comprises an inner end 1 in which are made two grooves 1a and an outer end 2 in which are made two complimentary grooves 2a. According to an essential feature of the invention the four grooves are semi-cylindrical and face one another in pairs to receive the two balls $3_s$ and $3_i$ and their diameter, in cross-section, is oriented in the manner clearly shown in FIG. 1 in accordance with a diagonal D, it being important to note that this diagonal must be reversed in the case of a reversal of the rotation direction E of the joint.

Figures 1, 2, 3, 4, 5, 6, 7, 8:
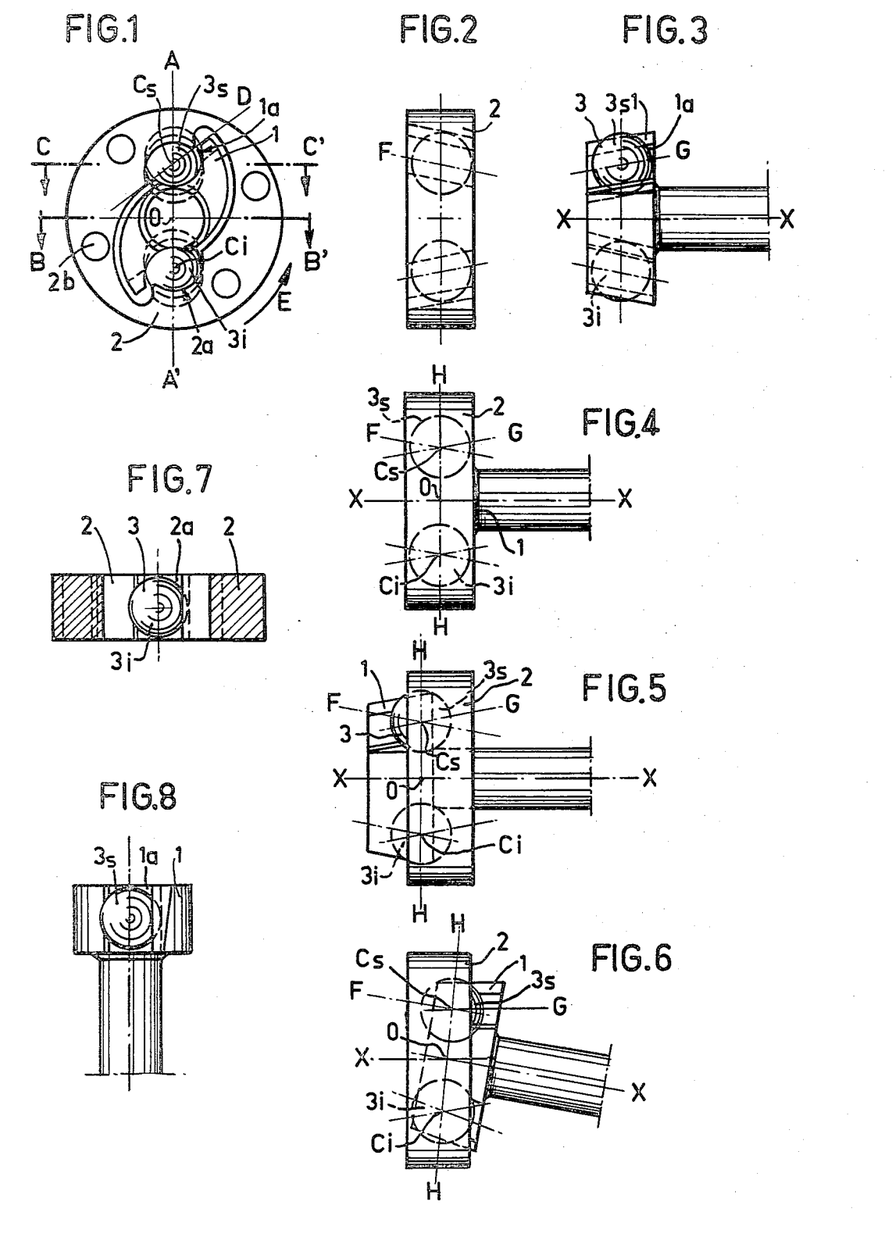
FIG. 1 a front view of a first possible embodiment of a joint according to the invention having integrated sliding and two balls.
FIG. 2 a profile view of the outer end of the same joint as in FIG. 1.
FIG. 3 a profile view of the inner end of the same joint as in FIG. 1.
FIG. 4 a profile view of the same joint as in FIG. 1, the two ends being embedded moderately in one another.
FIG. 5 a profile view of the same joint as in FIG. 1, the two ends having slid in one another and being located on the same longitudinal axis.
FIG. 6 a profile view of the same joint as in FIG. 1, the two ends having slid into one another in the opposite direction from that of FIG. 5, the respective longitudinal axis thereof being disposed angularly with respect to the other.
FIG. 7 a plan view in section along the line B—B' of the outer end of the joint of FIG. 1.
FIG. 8 a plan view of the inner end of the joint of FIG. 1.
Figure 9:
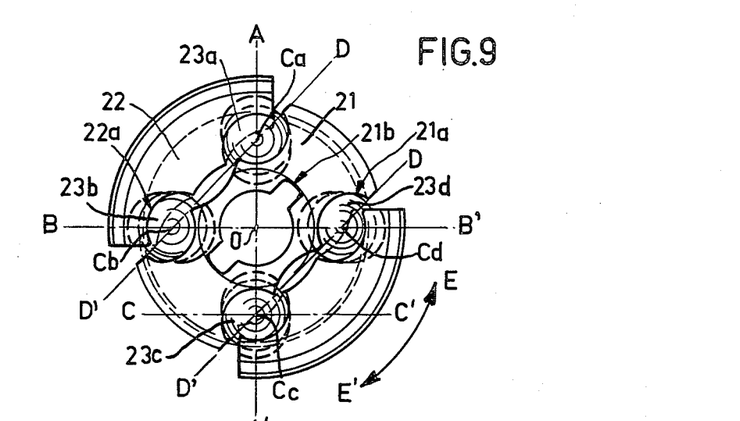
FIG. 9 a front view of a second possible embodiment of a joint according to the invention with integrated sliding and having four balls.
Figure 10:
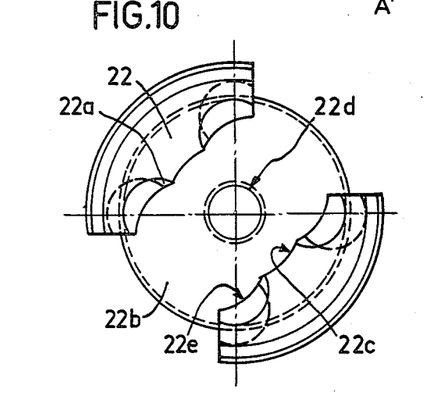
FIG. 10 a front view of the outer end of the joint of FIG. 9.
Figure 11:
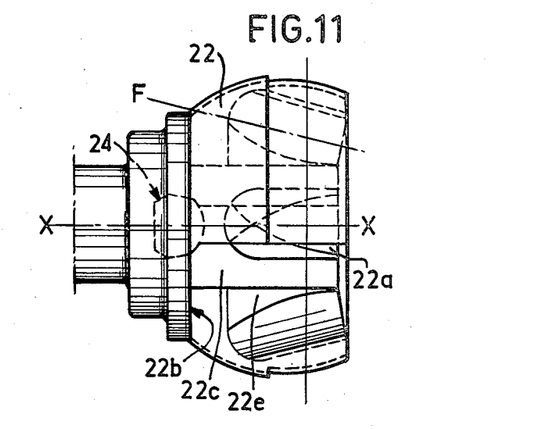
FIG. 11 a profile view of the outer end of the joint of FIG. 9.
Figure 12:
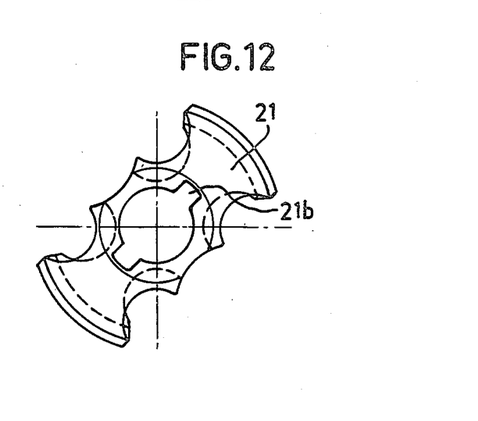
FIG. 12 a front view of the inner end of the joint of FIG. 9.
Figure 13:
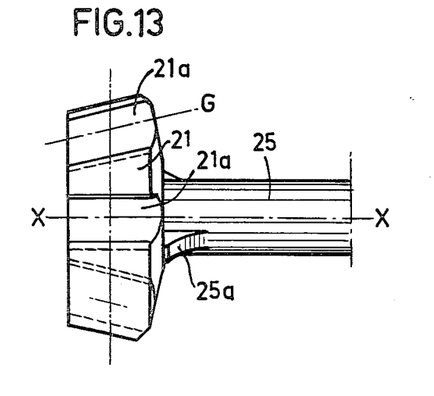
FIG. 13 a profile view of the inner end of the joint of FIG. 9.

Moreover, grooves 1a and 2a are made in ends 1 and 2 in such a way that the centres $C_s$ and $C_i$ of the two balls $3_s$ and $3_i$, when the joint occupies the position of balance shown in FIGS. 1 and 4, are positioned symmetrically relative to the geometrical centre O of the joint. Each of the centres of the two balls is positioned, in accordance with the invention, at the intersection of on the one hand the radial axis AA' passing through the geometrical centre O of the joint and perpendicular to the longitudinal axis XX of the two ends of the joint and on the other hand of a transverse axis of symmetry C—C' perpendicular to the axis AA' and finally of the diagonal D, which is in fact the bisectrix of the right angle between the axes CC' and AA'. It should be noted that the transverse axis C—C' is also parallel to the axis BB', which passes through the geometrical centre O of the joint and is also perpendicular to the longitudinal axis XX of the two ends of the joint and of axis AA'.

It can be gathered from the drawings and in particular FIG. 1 that this diagonal arrangement of the grooves 1a and 2a causes each of the two balls $3_s$ and $3_i$ to roll and be guided between two poles located on the radial axis AA' perpendicular to the longitudinal axis XX of the joint and two other poles located on the axis CC' perpendicular to the radial axis.

Thus, the torque is transmitted in directions to the right or left, but it should be noted that the rotation in direction E of the joint is preferred if end 1 is leading and end 2 is led.

According to another feature of the invention grooves 1a and 2a are oppositely and symmetrically inclined with respect to the longitudinal axis XOX of ends 1 and 2. Thus, the opposite inclination angle F of grooves 2a of end 2 relative to longitudinal axis XOX of the joint corresponds to inclination angle G of grooves 1a of end 1 relative to the same longitudinal axis XOX, as can best be seen from FIG. 4. Moreover, and as is apparent from FIGS. 1, 2 and 3, the longitudinal axes of grooves 1a and 2a are perpendicular to the transverse axis CC'.

For example four holes 2b are advantageously made in end 2 in such a way as to permit the fixing thereof to a support, whilst it being obvious that any other fixing process can be used.

In this case the introduction of the two balls $3_s$ and $3_i$ into their respective complimentary grooves 1a and 1b is very simple, because the joint is sliding. It is merely necessary to bring the two ends into a facing position, place the two balls at the inlet for grooves 1a for example and then push end 1 within end 2 until the centres of the balls and the bisecting plane HH are in the median position of FIG. 4.

When the two balls $3_s$ and $3_i$ have been introduced in this way and the two ends 1 and 2 are brought into the median embedding position of FIG. 4 it can be seen that the centres $C_s$ and $C_i$ of the balls $3_s$ and $3_i$ are positioned on the bisecting plane HH, which is then perpendicular to the longitudinal axis XX of the joint and contains the geometrical centre O of the latter.

As a result of the invention the balls are thus constantly and imperatively positioned on the bisecting plane HH without the use of any intermediate means.

It is readily apparent that if inner end 1 is slid in outer end 2, whilst maintaining said ends in such a way that they remain on the same longitudinal axis XOX in order to pass from the relative position of FIG. 4 to the relative position of FIG. 5 bisecting plane HH is translated parallel to itself by a distance equal to half the difference by which end 1 has moved relative to end 2. During this displacement balls $3_s$ and $3_i$ have rolled in the two corresponding grooves 1a and 2a, their centre $C_s$ or $C_i$ having been displaced by half the distance by which the complimentary grooves 1a and 2a have been displaced relative to one another, whilst remaining imperatively positioned on the bisecting plane HH during the displacement thereof.

If now end 1 is turned within end 2 in order to pass from the relative position of FIG. 4 to the relative position of FIG. 6 it is immediately apparent that in this case the lower ball $3_i$ remains stationary, whilst the upper ball $3_s$ rolls between the complimentary upper grooves, its centre $C_s$ being displaced by half the distance by which groove 1a moves relative to groove 2a. In this case the bisecting plane HH is moved by pivoting about centre $C_i$ of lower ball $3_i$ which remains stationary, centre $C_s$ of upper balls $3_s$ and the geometrical centre O of the joint remaining constantly positioned on the bisecting plane HH during the pivoting thereof.

Obviously if end 1 rotates whilst moving end 2 balls $3_s$ and $3_i$ roll and are guided between two poles located on axis AA' and two poles located on axis CC', the centres $C_s$ and $C_i$ of the balls being thus imperatively maintained on the bisecting plane HH, without intermediate means being necessary.

It is also clear that the two balls $3_s$ and $3_i$ transmit the torque in the two rotation directions of the joint, whereby it should be noted that the unitary pressures on the balls are considerably reduced in one of the two rotation directions.

According to a second possible embodiment of a joint according to the invention having four balls and with integrated sliding, shown in exemplified manner in FIGS. 9 to 16, the joint essentially comprises an inner end 21 having four grooves 21a and an outer end 22 having four complimentary grooves 22a. The four groups of two complimentary grooves are uniformly distributed relative to the geometrical centre O of the joint facing one another in pairs in order to receive the four balls 23a, 23b, 23c and 23d. According to the essential feature of the invention all the grooves are semi-cylindrical and oriented on this occasion in accordance with two inverse diagonals D—D'.

As in the previously described cases this arrangement causes each of the balls 23a, 23b, 23c and 23d, such as for example ball 23c, roll and be guided in grooves 21a and 22a between two poles located on a radial axis AA' and two poles located on an axis CC' perpendicular to the first, centre Cc of the ball being located at the intersection of said axes AA' and CC' and the corresponding diagonal D', which is the bisectrix of angle $C,C_c,A'$.

In this case the torque is transmitted either to the right in the direction E' or to the left in direction E.

Moreover, grooves 21a and 22a are oppositely and symmetrically inclined relative to the longitudinal axis XX of ends 21 and 22. The opposite inclination angle F of grooves 22a of end 22 corresponds to the inclination angle G of grooves 21a of end 21, the longitudinal axes of the grooves being perpendicular to the axis CC' whereby, as stated hereinbefore, the latter is perpendicular to the radial axis AA' and parallel to the axis BB' passing through the geometrical centre O of the joint.

Figure 14:
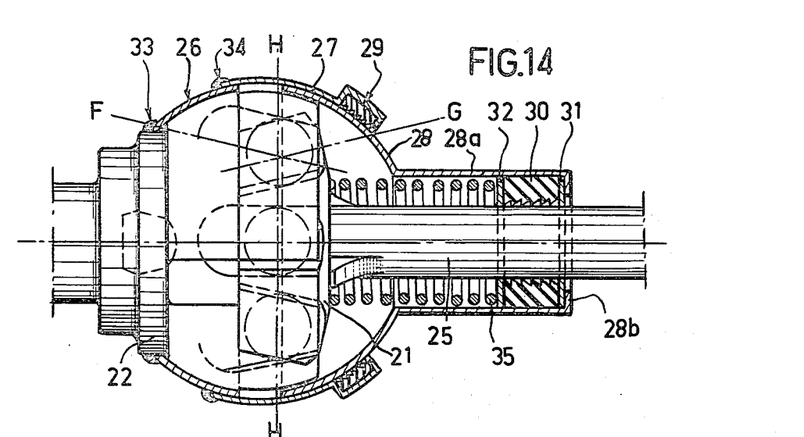
FIG. 14 a profile view of the joint of FIG. 9, but provided with a protective casing with a floating shaft compensation spring, the two ends being embedded moderately in one another.
Figure 15:
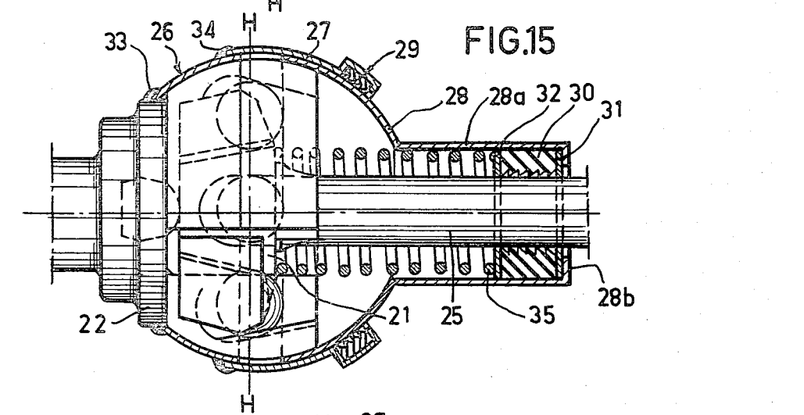
FIG. 15 the same profile view as that of FIG. 14, the two ends having slid into one another.
Figure 16:
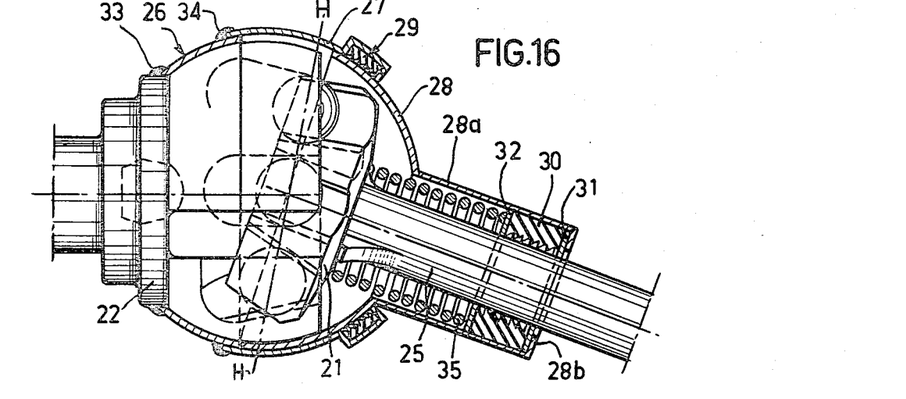
FIG. 16 the same profile view as in FIGS. 14 and 15, whereby however the inner end has slid in the opposite direction to FIG. 15 and the respective longitudinal axis of the two ends being disposed angularly relative to one another.
Figure 17:
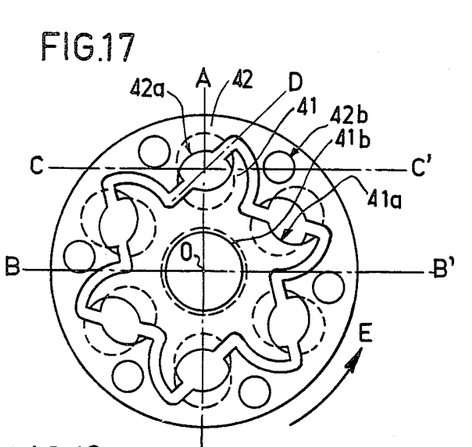
FIG. 17 a front view of a third possible embodiment of a joint according to the invention with integrated sliding and having six balls, the latter not being shown for reasons of the clarity of the drawing.
Figure 18:
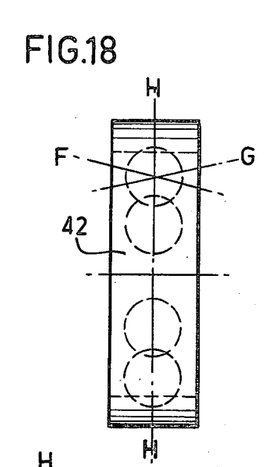
FIG. 18 a profile view of the same joint as in FIG. 17, the two ends being moderately embedded in one another.

Through the combination of all these conditions balls 23a, 23b, 23c and 23d are constantly and imperatively positioned in the same sliding bisecting plane HH (cf FIGS. 14, 15, 16).

According to the represented embodiment the structure of the outer end 22 has clearances 22b, 22c and 22e and a projection 24 made from a flexible material and which is inserted in a blind hole 22d and has the effect of limiting the travel of end 21, which is equipped with a floating shaft 25 having male channels 25a engaged in the bore with female channels 21b.

The balls are introduced into their respective complimentary grooves in the manner described hereinbefore with reference to the joint with integrated sliding represented in FIGS. 1 to 8.

Different phases of the angular work and the sliding of the joint are illustrated in FIGS. 14, 15 and 16 and a detailed description thereof will not be provided again.

It should be noted that the joint shown in these drawings is advantageously provided with a protective device comprising a cap 26 welded at 33 onto outer end 22; a second cap 27 welded at 34 onto cap 26 and provided with a recess for a gasket 29 made from a flexible material appropriate for the friction and therefore having a high Shore hardness and a third cap 28 extended by a tubular portion 28a having a recess for a gasket 28b, said cap 28 acting between end 22 with which it is not in contact and cap 27 against which it bears in order to compress a spring 35 against end 21. The function of spring 35 is to relatively balance the floating shaft 25 between the joint of FIGS. 14, 15 and 16 coupled in tandem to another sliding joint (not shown in the drawings), which is provided with an identical spring which, like spring 35, always works in compression. Finally a gasket 30 made from a flexible material is embedded between two slotted washers 31 and 32, whereby said device can advantageously be completed by a grease fitting.

According to a third possible embodiment of a joint according to the invention having six balls and with integrated sliding, shown in exemplified manner in FIGS. 17 to 21, the joint essentially comprises an inner end 41 having six grooves 41a and an outer end 42 having six complimentary grooves 42a. The six groups of two complimentary grooves are uniformly distributed relative to the geometrical centre O of the joint, whereby they face one another in pairs for receiving the six balls such as 43a, 43b, 43c, 43d, shown in FIGS. 19 and 20. In accordance with the essential characteristic of the invention all these grooves are semi-cylindrical and oriented in accordance with a diagonal D, whereby it should be noted that the latter must be reversed in the case of the reversal of the rotation direction E of the joint.

As in the previous cases described hereinbefore this arrangement causes each of the six balls, such as for example ball 43a to roll and to be guided in grooves 41a and 42a between two poles located on a radial axis AA' and two poles located on an axis CC' perpendicular to the first axis. The torque is therefore transmitted in two directions, to the right or to the left, the rotation in direction E being preferred if the inner end 41 is leading and the outer end 42 led.

Moreover the grooves 41a and 42a are oppositely and symmetrically inclined relative to the longitudinal axis XX of ends 41 and 42. The opposite inclination angle F of grooves 42a of end 42 corresponds to inclination angle G of grooves 41a of end 31, the longitudinal axes of said grooves being perpendicular to axis CC' which, as has been stated hereinbefore, is perpendicular to the radial axis AA' and parallel to the axis BB' passing through the geometrical centre O of the joint.

Figure 19:
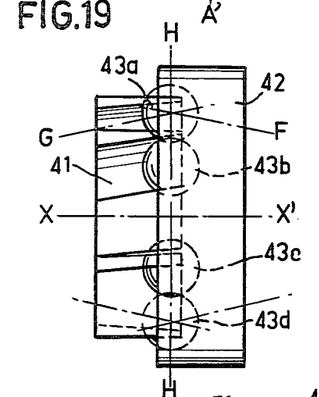
FIG. 19 the same profile view as in FIG. 18, the two ends having slid into one another.
Figure 20:
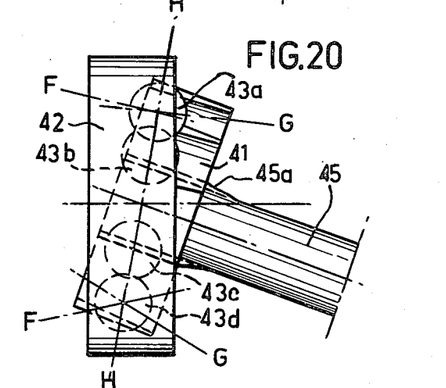
FIG. 20 the same profile view as in FIGS. 18 and 19, whereby however the inner end has slid in the opposite direction to that of FIG. 19, the longitudinal axis of the two ends being disposed angularly relative to the other and the inner end is provided with its shaft.

As can be gathered from FIGS. 19 and 20 when all these conditions are combined the six balls must be constantly and imperatively positioned in the same sliding bisecting plane HH, the balls effecting half the sliding of end 41 in end 42.

Obviously the two ends 41 and 42 are separated by a sufficient space to permit their angular work, as shown in FIG. 20.

For example six holes 42b are advantageously made in end 42 in order to permit the fixing of the latter to a support, whereby it is obvious that any other fixing process may be used. Moreover, the driving shaft 45 for end 41 is advantageously provided with male channels 45a force-fitted into corresponding female channels 41b in end 41.

The introduction of the six balls into their respective complimentary grooves is carried out in the manner described hereinbefore with reference to the sliding joint of FIGS. 1 to 8.

Figure 21:
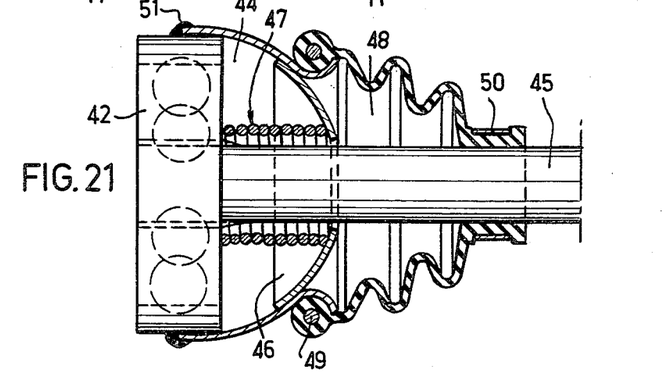
FIG. 21 a profile view of the joint of FIG. 17, but provided with a protective casing with floating shaft compensation spring, the two ends being moderately embedded in one another.
Figure 22:
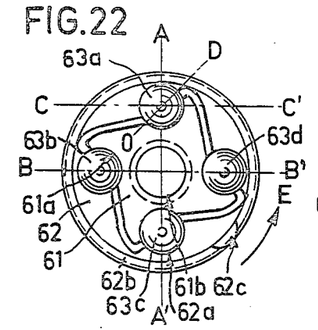
FIG. 22 a front view of a fourth possible embodiment of a joint according to the invention with integrated sliding and having four balls.
Figure 23:
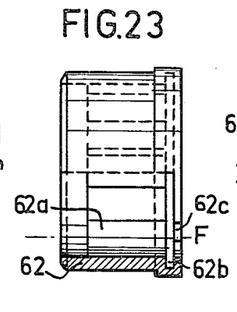
FIG. 23 a profile view with part section of the outer end of the joint of FIG. 22.
Figure 24:
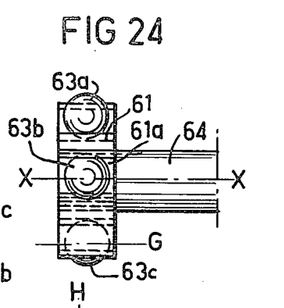
FIG. 24 a profile view of the inner end of the joint of FIG. 22 provided with its shaft.

FIG. 21 shows the joint in the form which it assumes when equipped with a protective device. In the represented embodiment the latter comprises a cap 44 welded at 51 to outer end 42 after the insertion of a cap 46 and a spring 47. This spring is compressed between cap 46 and end 41 and serves to relatively balance the floating shaft 45 between the joint of FIG. 21 and another identical sliding joint and equipped with an identical spring constantly working in compression, said other joint (not shown) being coupled to the joint of FIG. 21. The protective device also advantageously has a bellows 48 made from a flexible material and which is fixed on the one hand to cap 44 by means of a metal reinforcing ring 49 inserted into an appropriate groove of said cap and on the other hand to shaft 45 by means of a clamp 50.

According to a fourth possible embodiment of a joint according to the invention with four balls and integrated sliding, shown in exemplified manner in FIGS. 22 to 27, the joint essentially comprises an inner end 61 having four grooves 61a and an outer end 62 having four complimentary grooves 62a. The four groups of two complimentary grooves are uniformly distributed relative to the geometrical centre O of the joint, whereby they face one another in pairs to receive the four balls 63a, 63b, 63c and 63d.

According to the essential feature of the invention all the grooves are semi-cylindrical and oriented in accordance with a diagonal D, whereby it should be noted that the latter must be reversed in the case of a reversal of the rotation direction E of the joint.

As in the previously described cases this arrangement makes each of the four balls, such as for example ball 63a roll between two poles located on a radial axis AA' and two poles located on an axis CC' perpendicular to the first axis. Thus, torque is transmitted in two directions, to the right or to the left, the rotation in the direction E being preferred if the inner end 61 is leading and the outer end 62 is led.

According to a special feature of the present embodiment the respective longitudinal axes G and F of groove 61a of the inner end and groove 62a of the outer end coincide and are parallel to the longitudinal axis XX of said ends 61 and 62.

This arrangement, which makes machining easier, makes it necessary for the purpose of obtaining the constant angularly of the two complimentary grooves and constantly and imperatively positioned balls 63a, 63b, 63c and 63d on the same bisecting plane HH to angularly position the said complimentary grooves 61a and 62a relative to one another by displacing the two identical joints $J_1$ and $J_2$ constituting a complete transmission relative to one another during assembly.

Figure 25:
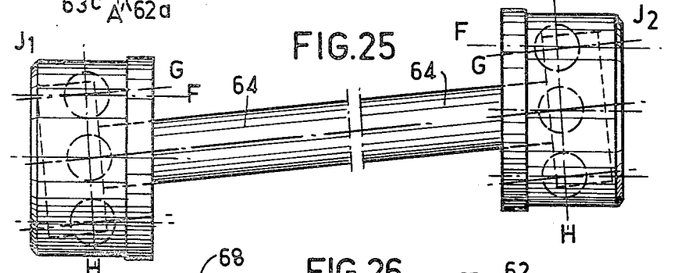
FIG. 25 a diagrammatic profile view of the two joints of FIG. 22 coupled for use for example in a vehicle transmission with rear propulsion and independent wheels, said transmission being in plan view relative to the deflection of the vehicle wheel, the two joints being off-centered relative to one another in such a way as to obtain a constant shear of the four balls in their receiving grooves.

FIG. 25 shows a plan view of such a transmission assembly. The balls are introduced into their respective complimentary grooves 61a and 62a in the manner described hereinbefore with reference to the integrated sliding joint shown in FIGS. 1 to 8.

Figure 26:
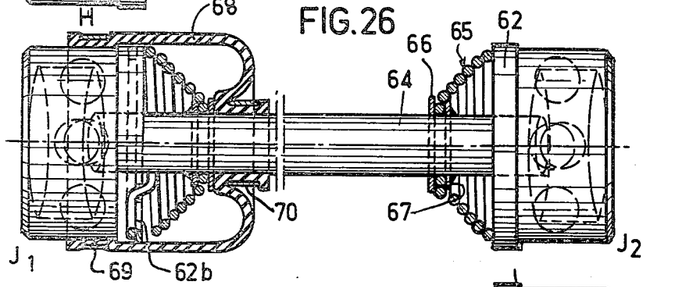
FIG. 26 diagrammatically and with a small partial section the same transmission as in FIG. 25, but in profile with, (after a 90° rotation) relative to the latter and provided with a protective casing with floating shaft compensation spring between the two joints.
Figure 27:
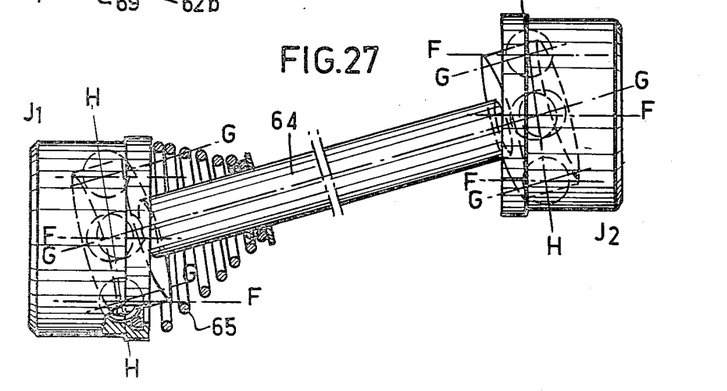
FIG. 27 the same transmission as in FIG. 26, but in a position of displacement between the two joints.
Figure 28:
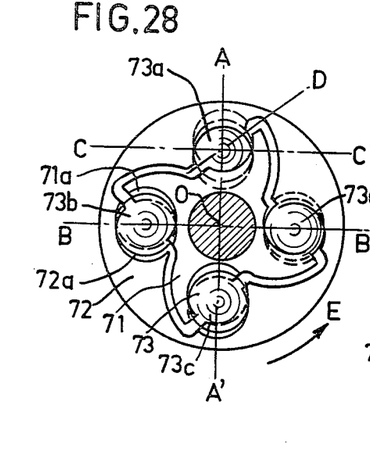
FIG. 28 a front view of a fifth possible embodiment of a joint according to the invention with integrated sliding and having four balls.
Figure 29:
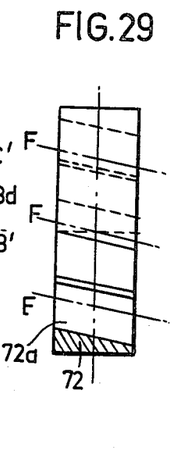
FIG. 29 a profile view with part section of the outer end of the joint of FIG. 28.
Figure 30:
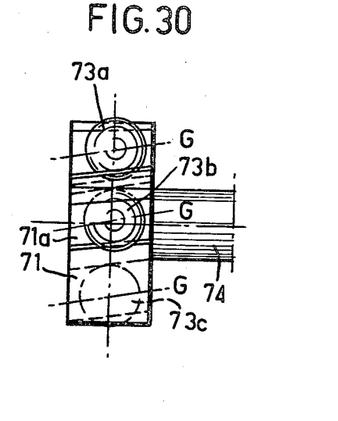
FIG. 30 a profile view of the inner end of the joint of FIG. 28.

The assembly procedure becomes very clear by comparing FIG. 26, which is a plan view of a complete transmission system with two joints $J_1$ and $J_2$ and in which the angle is zero and FIG. 27 which is a profile view of the same complete transmission system with two joints $J_1$ and $J_2$ and in which the constant angularity between the two axes F and G is obtained by the displacement of the two joints $J_1$ and $J_2$.

These joints may advantageously be provided with a protective device comprising a bellows 68 made from a flexible material and fixed to end 62 and to shaft 64 by clamps 69 and 70. A conical spring 65 working in extension is inserted in a groove 62b of end 62 and is locked by a washer 67 welded to shaft 64 and a washer 66 locked by the sleeve of bellows 68. The function of spring 65, constantly working under extension, is to relatively balance the floating shaft 64 between the two ends 62 of joints $J_1$ and $J_2$, said spring preventing the balls from being removed from their race. Obviously this solution is not obligatory and can be replaced by any equivalent solutions permitting the same result to be achieved.

According to a fifth possible embodiment of a joint according to the invention with four balls and integrated sliding, which is shown in exemplified manner in FIGS. 28 to 33, said joint comprises an inner end 71 with four grooves 71a and an outer end 72 with four complimentary grooves 72a. The four groups of two complimentary grooves are uniformly distributed relative to the geometrical centre O of the joint, facing one another in pairs so as to receive the four balls 73a, 73b, 73c and 73d.

According to the essential feature of the invention all the grooves are semi-cylindrical and oriented in accordance with a diagonal D, whereby it should be noted that the latter must be reversed if the rotation direction E of the joint is reversed.

As in the previously described cases this arrangement makes each of the four balls, such as for example ball 73a roll and be guided between two poles located on a radial axis AA' and two poles located on an axis CC' perpendicular to the first axis. The torque is transmitted in two directions, to the right or to the left, the rotation in direction E being preferred if the inner end 71 is leading and the outer end 72 led.

According to a feature of the present embodiment the longitudinal axes of the grooves of one end are angularly reversed relative to the grooves of the other end, but the system of grooves is oriented in the same direction.

Thus, two of the grooves 71a and 72a can have their inclination angle G-F centered on axis AA', whilst the inclination angles of the two other grooves 71a and 72a can be parallel to axis BB', whereby said arrangement can facilitate machining, the angles G-F of each of the grooves intersecting on axis CC'.

The four balls are introduced into their respective complimentary grooves in the manner described hereinbefore relative to the integrated sliding joint shown in FIGS. 1 to 8.

Moreover, shaft 74 may form an integral part of one of the ends, for example inner end 71 or conversely can be connected to said end.

Figure 31:
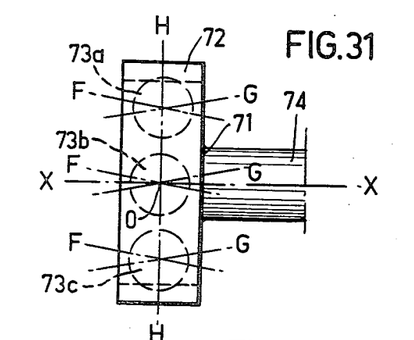
FIG. 31 a profile view of the joint of FIG. 28, the two ends being moderately embedded in one another.

The inclination angles G-F of the grooves, according to FIG. 31, interact on the bisecting plane HH, but the said grooves may also be longitudinally displaced to the right or left during machining, whereby the bisecting plane HH follows said displacement.

Figures 32, 33:
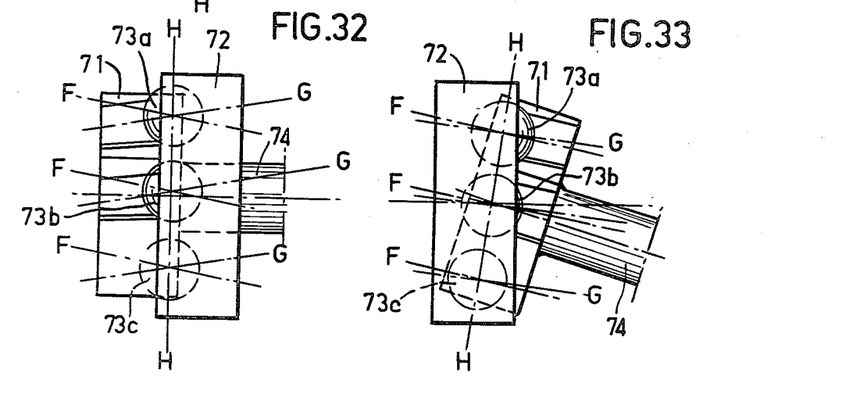
FIG. 32 a profile view of the joint of FIG. 28, the two ends having slid longitudinally into one another.
FIG. 33 a profile view of the joint of FIG. 28, the two ends having slid longitudinally in the opposite direction to that of FIG. 32 and the respective longitudinal axes being disposed angularly with respect to one another.

Whereas in FIG. 31 ends 71 and 72, as well as bisecting plane HH of the joint are centred on the geometrical centre O of the joint, in FIG. 32 ends 71 and 72 have slid longitudinally and in FIG. 33 this sliding is effected in the opposite direction and, in addition, the ends are angularly inclined relative to one another. It is clear that in all these respective movements the bisecting plane has effected half the respective sliding of the ends and that the four balls have remained constantly and imperatively positioned on the bisecting plane during these movements.

Obviously the present invention has only been described and represented in a preferred exemplified manner and numerous equivalent modifications can be made thereto without passing beyond the scope of the invention as defined in the following claims.

Thus, various modifications can be made with a view to reinforcing the components.

It is also obvious that if the axial centering of the shafts is automatically ensured by the balls the joints can be longitudinally centred by means of hemispherical caps in accordance with a prior art method.

Moreover when the joint has a protective device in which a spring is used the latter can either work in compression or in extension, or can be neutral at midtravel and then work either in compression or in extension, the function of one or other of these springs is to maintain a relative balance of the floating shaft connecting the two joints forming a transmission system.

It is obvious that the two joints forming a transmission system may or may not be identical, i.e. one of the joints can slide and the other not slide or the two joints can slide.

I claim:

1. A homokinetic joint for the transmission of a torque between two ends by balls engaged in the races made in said ends, comprising an inner end and an outer end, at least two tracks whereof each is constituted by two semicylindrical grooves made respectively in the inner end and the outer end, each of said grooves having its diameter in cross-section contained in the bisecting plane passing through the geometrical centre of the joint and the geometrical centre of the ball contained in the groove, oriented diagonally in accordance with the bisectrix of the angle between a radial axis, passing through the geometrical centre of said ball and said geometrical centre of the joint and perpendicular to the longitudinal axis of the corresponding end, and an axis perpendicular to said radial axis and passing through the geometrical centre of the ball in question, as a result of which each of the balls is made to roll and to be guided between two poles located on the radial axis and two other poles located on the axis perpendicular to the radial axis which has the effect of constantly and imperatively maintaining the geometrical centres of the balls of the bisecting plane of the respective longitudinal axes of the two ends and of causing the balls to transmit the torque in two rotation directions of the joint, the unitary pressure on the balls being considerably decreased in one of the two rotation directions.

2. A homokinetic joint according to claim 1, wherein the inner end has the possibility of sliding longitudinally within the outer end, the bisecting sliding plane and the balls effecting half the sliding action, a sufficient space separating the two ends to permit their angular work and the two grooves forming a ball race being disposed angularly with respect to the longitudinal axis of the two ends, the longitudinal axes of the two grooves of one race being symmetrically inclined in accordance with inverse angles and intersecting on the sliding bisecting plane of the joint.

3. A homokinetic joint according to claim 2, wherein half the ball race is oriented generally in one direction and the other half of said race is oriented in the opposite direction, the torque being transmitted between the two ends under the same conditions in both rotation directions of the joint.

4. A homokinetic joint according to claim 2, wherein the two grooves forming a ball race are positioned parallel to the longitudinal axis of the end in which they are made, the constant angularly of the two grooves being obtained by a displacement at the time of assembly of the two joints, whose inner ends are connected by a common floating shaft, the two thus assembled joints forming a complete transmission system.

5. A homokinetic joint according to claim 2, wherein the longitudinal axes of the grooves of one of the ends are angularly reversed compared with the longitudinal axes of the complimentary grooves of the other end, but the system of grooves of the same end is oriented in the same direction.

* * * * *